United States Patent

Giles

[15] 3,684,073
[45] Aug. 15, 1972

[54] CONVEYOR SYSTEM
[72] Inventor: James Giles, Franklin Park, Ill.
[73] Assignee: American Chain & Cable Company, New York, N.Y.
[22] Filed: Dec. 18, 1970
[21] Appl. No.: 99,418

[52] U.S. Cl. .................................193/36, 60/52 T
[51] Int. Cl. .................................................B65g 13/00
[58] Field of Search..........198/21, 24, 127; 60/52 T, 52 HF; 193/36

[56] References Cited

UNITED STATES PATENTS

| | | | |
|---|---|---|---|
| 3,194,376 | 7/1965 | Holben | 193/36 |
| 2,094,526 | 9/1937 | Carlson | 60/52 R |
| 3,058,565 | 10/1962 | Byrnes | 193/36 |

Primary Examiner—Evon C. Blunk
Assistant Examiner—Hadd S. Lane
Attorney—Barnes, Kisselle, Raisch & Choate

[57] ABSTRACT

A conveyor system including a first conveyor along which articles are moved in a predetermined path and a second conveyor to which the articles are transferred from the first conveyor. A pusher bar is mounted for movement upon signal to engage an article and deflect a front corner of the article onto high speed rollers. The high speed rollers assume control of the article and direct the article around a roller stop onto the second conveyor and force it onto the second conveyor. The pusher bar is operated at a first speed and force until it engages the article and thereafter is operated at an increased speed and force until it deflects the article onto the high speed diverting rollers the required distance. The pusher bar returns to rest and the article is transferred to the second conveyor.

18 Claims, 2 Drawing Figures

PATENTED AUG 15 1972 3,684,073

INVENTOR.
JAMES GILES
BY
Barnes, Kisselle, Raisch & Choate
ATTORNEYS

CONVEYOR SYSTEM

This invention relates to conveyor systems and particularly to systems for diverting or switching articles being carried along a conveyor to branch or spur conveyors.

BACKGROUND OF THE INVENTION

In conveyors such as roller or endless belt conveyors, it is quite common to divert or switch articles such as cases or boxes from one conveyor to another at selected points along the first conveyor, for example, to select articles of different sizes and the like.

Among the objects of the present invention are to provide a conveyor system wherein articles can be transferred readily from one conveyor to another without the need for specific spacing between the articles; wherein the transfer can occur without damage to the article or its contents; which requires small space; which can be added to any point along the main conveyor; which can be adjusted to handle different sizes of articles; and which can be adapted for moving articles onto a second conveyor in the same or a different relatively oriented position with respect to the conveyor.

SUMMARY OF THE INVENTION

In accordance with the invention, a conveyor system including a first conveyor along which articles are moved in a predetermined path and a second conveyor to which the articles are transferred from the first conveyor. A pusher bar is mounted for movement upon signal to engage an article and deflect a front corner of the article onto high speed rollers. The high speed rollers assume control of the article and direct the article around a roller stop onto the second conveyor and force it onto the second conveyor. The pusher bar is operated at a first speed and force until it engages the article and thereafter is operated at an increased speed and force until it deflects the article onto the high speed diverting rollers the required distance. The pusher bar returns to rest and the article is transferred to the second conveyor.

DESCRIPTION

Figure 1:
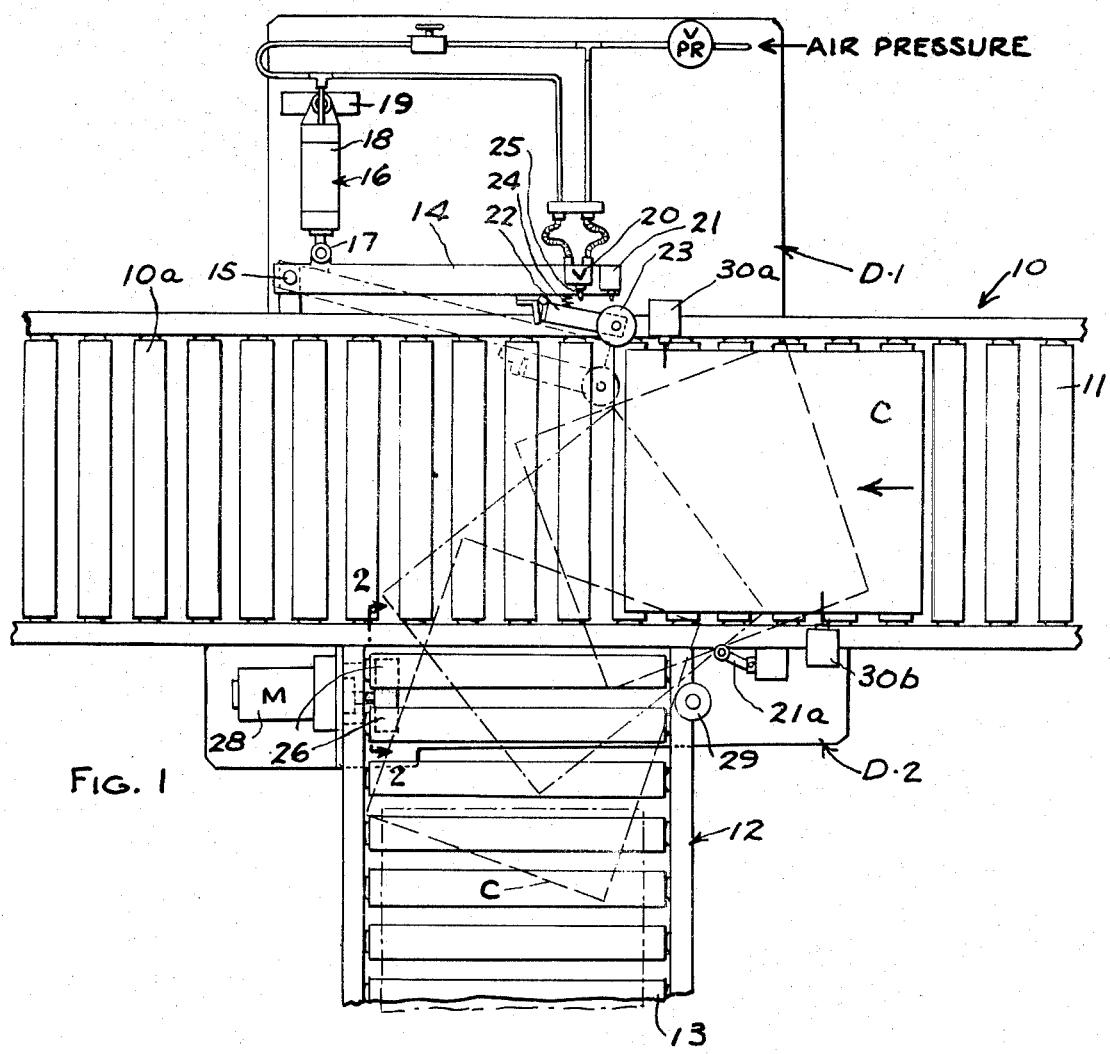
FIG. 1 is a plan view of a conveyor system embodying the invention.

Referring to the drawings, the conveyor system embodying the invention comprises a first or main conveyor 10 which is shown as comprising a plurality of spaced rollers 11 that may be driven in accordance with well known practice or the conveyor may be of the gravity type. As will be apparent, the invention is also applicable to other types of conveyors such as endless conveyors. The system further includes a second or branch conveyor 12 which comprises a plurality of rollers 13. Second conveyor 12 is at an angle to the path of the first conveyor 10.

As shown, the conveyor system is adapted to handle articles such as cases C that are moved along the conveyors. At a point on the main conveyor 10 opposite the end of the second conveyor 12, a diverting or switching device D is provided alongside the main conveyor adjacent rollers 10a. The switching device D comprises a first part D–1 mounted adjacent conveyor 10 and a second part D–2 mounted between conveyor 10 and conveyor 12. Part D–1 includes a pusher bar 14 that is pivoted at 15 in a manner such that the free end extends in a direction opposite to the direction of movement of the articles along the conveyor 10 in order that the pusher bar will not interfere by contact with the trailing end of the article as it is being transferred. A fluid motor such as linear air cylinder 16 has its shaft 17 pivoted to the pusher bar and its cylinder 18 pivoted to a fixed point 19 so that by application of fluid to the linear motor, the pusher bar 14 can be moved and swung into position toward and away from the path of the articles C.

The operation of the fluid motor 16 is controlled by a valve 20 on pusher bar 14 which, in turn, is turned on and off by a switch 21. The valve 20 has two positions, one wherein fluid is supplied to the cylinder 16 at a faster rate, for reasons presently described.

An actuating member 22 is pivoted to the switch arm 14 and includes a roller 23 for engaging the article C. A spring 24 yieldingly urges the actuating member 22 outwardly from pusher bar 14.

Sensors 30a and 30b are provided at longitudinally spaced points along and on opposite sides of conveyor 10 in advance of the pusher bar 14 and are connected in series.

Figure 2:
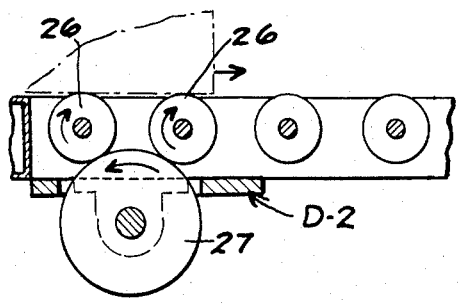
FIG. 2 is a fragmentary sectional view on an enlarged scale taken along the line 2—2 in FIG. 1.

When it is desired to divert an article onto the conveyor 12 from the conveyor 10, sensors 30a and 30b, which are located in series, are energized to open the valve on cylinder 16 causing fluid to flow to the cylinder through a flow control valve which moves the pusher bar towards and into engagement with the article C. Upon engagement with the article C, the actuator 22 is swung toward the pusher bar 14 actuating the plunger 25 of valve 20 and energizing switch 21 which also controls the solenoid valve on the cylinder 16. Opening the valve 20 increases the flow of fluid to the cylinder thereby increasing the speed and force with which the pusher bar swings. Thus, after engagement with the article C, the pusher bar 14 is swung at an increased rate quickly pushing the leading corner of the article onto the high speed diverting rollers 26, which now take over and divert the article onto the conveyor 12, pivoting it round the roller pivot 29. Before this point the article will have lost contact with the sensors 30a and 30b and will have become de-energized. However, the pusher bar 14 will continue to push the article towards the high speed rollers because the solenoid valve on the cylinder 16 is now energized through the switch 21 on the pusher bar. The pusher bar continues to push the article until the article actuates the switch 21a. This de-energizes the solenoid valve on the cylinder allowing the pusher bar to return to the rest position by means of a return spring. The two high speed diverting rollers 26 of the diverter assembly (FIG. 2), which are aligned with conveyor 12, are driven at an increased speed by a friction drive roller or by a chain operated by a motor 28, so that once a portion of each article to be diverted engages on the first roller 26, the article is quickly moved around the roller pivot 29 and moved off on the conveyor 12, maintaining the same relative orientation. The sensors 30a and 30b are in series to avoid pulsing the pusher bar as the tail end of the article swings past sensor 30a on its way to the second conveyor 12. The pusher bar should be located with the roller 23 approximately in line with the roller pivot 29.

In the event that it is desired to push the article sidewise onto the second conveyor 12, roller pivot 29 is eliminated and a fixed pivot is installed in an opposite position on the other side of the conveyor 12. The pusher bar is located to engage the article slightly in front of its center so that the article will assume a different orientation on the second conveyor with a side thereof providing the leading face of the article on the second conveyor 12.

I claim:

1. In a conveyor system, the combination comprising
   a first conveyor for moving successive articles in a predetermined path,
   a second conveyor for receiving said articles from said first conveyor and extending at an angle to a portion of the path of the first conveyor,
   a pusher bar mounted at one side of said first conveyor away from said second conveyor,
   said pusher bar being movable toward said second conveyor,
   means for moving said pusher bar inwardly of said first conveyor to engage an article thereon,
   said means being operable at a slow rate and a fast rate,
   means responsive to the engagement of said pusher bar with said article to cause said pusher bar moving means to move said pusher bar at the fast rate.

2. The combination set forth in claim 1 wherein said means for changing the rate of movement of said pusher bar is responsive to the engagement of the pusher bar with the article.

3. The combination set forth in claim 1 including means between said first and second conveyors for engaging said article to facilitate movement of said article onto said second conveyor.

4. The combination set forth in claim 1 including means responsive to movement of said article onto said second conveyor for causing said pusher bar moving means to return said pusher bar to its original position alongside said first conveyor.

5. The combination set forth in claim 1 including means for driving a portion of said second conveyor at an increased speed to facilitate removal of the article from the first conveyor.

6. The combination set forth in claim 1 wherein said pusher bar moving means comprises a fluid operated linear motor.

7. The combination set forth in claim 1 including means interposed between said first and second conveyor for engaging said article to cause said article to turn from said first conveyor to said second conveyor such that the leading end of the article remains in the same relative position to the second conveyor as to the first conveyor.

8. The combination set forth in claim 1 wherein said pusher bar is pivoted at one side of said first conveyor with its free end extending in a direction opposite to the direction of travel of the articles along said first conveyor.

9. The combination set forth in claim 1 wherein said first and second conveyors comprise roller conveyors.

10. For use in a conveyor system comprising a first conveyor for moving successive articles in a predetermined path, a second conveyor for receiving said articles from said first conveyor and extending at an angle to a portion of the path of the first conveyor, a diverting apparatus comprising
    a pusher bar adapted to be mounted at one side of said first conveyor away from said second conveyor,
    said pusher bar being adapted to be moved toward said second conveyor,
    means for moving said pusher bar so that it will engage an article on said first conveyor,
    said means being operable at a slow rate and a fast rate,
    means responsive to the engagement of said pusher bar with said article to cause said pusher bar moving means to move said pusher bar at the fast rate.

11. The combination set forth in claim 10 wherein said means for changing the rate of movement of said pusher bar is responsive to the engagement of the pusher bar with the article.

12. The combination set forth in claim 10 including means responsive to movement of said article by said pusher bar for causing said pusher bar moving means to return said pusher bar to its original position.

13. The combination set forth in claim 10 wherein said pusher bar moving means comprises a fluid operated linear motor.

14. The combination set forth in claim 10 wherein said pusher bar is pivoted and is adapted to have its free end extending in a direction opposite to the direction of travel of the articles along said first conveyor.

15. In an apparatus for transferring articles from one conveyor to another conveyor which extends at an angle to a portion of the path of the first conveyor, the combination comprising
    a first conveyor portion aligned with said first conveyor,
    a second conveyor portion at an angle to said first conveyor and aligned with said second conveyor,
    a pusher bar mounted at one side of said first conveyor portion away from said second conveyor portion,
    said pusher bar being movable toward said second conveyor portion,
    means for moving said pusher bar inwardly of said first conveyor portion to engage an article thereon,
    said means being operable at a slow rate and a fast rate,
    said means for changing the rate of movement of said pusher bar being responsive to the engagement of the pusher bar with the article,
    said second conveyor portion being operable at an increased speed to facilitate removal of the article from the first conveyor portion.

16. The combination set forth in claim 15 including means responsive to movement of said article by said pusher bar for causing said pusher bar moving means to return said pusher bar to its original position.

17. The combination set forth in claim 15 wherein said pusher bar moving means comprises a fluid operated linear motor.

18. The combination set forth in claim 15 wherein said pusher bar is pivoted and is adapted to have its free end extending in a direction opposite to the direction of travel of the articles along said first conveyor.

* * * * *